June 30, 1953 E. D. SPIERER Re. 23,674

DRYING APPARATUS

Original Filed June 11, 1951 3 Sheets-Sheet 1

INVENTOR.
Edward D. Spierer
BY
Robert S. Dunham
ATTORNEY

June 30, 1953 E. D. SPIERER Re. 23,674

DRYING APPARATUS

Original Filed June 11, 1951 3 Sheets-Sheet 2

INVENTOR.
Edward D. Spierer
BY
Robert S. Durham
ATTORNEY

June 30, 1953 E. D. SPIERER Re. 23,674

DRYING APPARATUS

Original Filed June 11, 1951 3 Sheets-Sheet 3

INVENTOR.
Edward D. Spierer
BY
Robert S. Dunham
ATTORNEY

Reissued June 30, 1953

Re. 23,674

UNITED STATES PATENT OFFICE 23,674

DRYING APPARATUS

Edward D. Spierer, Brooklyn, N. Y., assignor to Edi Holding, Inc., Brooklyn, N. Y., a corporation of New York Original No. 2,606,274, dated August 5, 1952, Serial No. 230,978, June 11, 1951. Application for reissue March 23, 1953, Serial No. 344,263

6 Claims. (Cl. 219—39)

Matter enclosed in heavy brackets [ ] appears in the original patent but forms no part of this reissue specification; matter printed in italics indicates the additions made by reissue.

The present invention relates to apparatus for drying objects, such as the hands of a user, and more particularly to such apparatus, which may be used at any place where a conventional source of electric power is available without the necessity of providing heavier power leads and other power supply facilities capable of providing higher amperage power than is available in the conventional electric outlets available in homes and business establishments and wherein, for example, the outlet may be protected by a fuse of a relatively low value, such as 15 amperes.

It has been customary in the past to provide hand drying apparatus wherein there is included a blower, usually operated by an electric motor, and wherein an electric heating means is provided on the downstream side of the blower for heating the air to a desired or predetermined temperature. In order that any substantial volume of air be heated very rapidly to a desired high temperature in such a device, the heat capacity and consequently the current consumption (amperage) for such a heating means must be quite high, often 40 to 50 amperes. Thus, when such a device is installed in a commercial establishment or in a home, it is necessary that there be a special power supply therefor, using very heavy wires so as to permit the safe passage of this high current. If such a power supply at high amperage is not available, it is, of course, necessary to provide it before the prior art devices, as above described, may be used. This may involve the reconstruction of a substantial portion of a building and be correspondingly and sometimes prohibitively expensive.

A primary general object of the present invention is to provide a device having a maximum power demand which will not overtax the conventional electric outlets available in stores and offices, wherein the size of the wires and the fuses commonly associated therewith are such as to limit the safe current to a value not greater than about 15 amperes, for example.

Obviously, it is impossible with a low current demand as aforesaid, to provide for the instantaneous heating of the desired volume of air to the desired temperature by the use of a heating element on the downstream side of the blower as was conventional in the prior art. The present invention resorts, therefore, to provide a heat storage means, which comprises a body of material of relatively high heat capacity and of substantial size, to which heat may be slowly but substantially continuously supplied at a rate much less than that required for the heating elements of prior art drying devices aforesaid, and at a rate which can be accommodated by the current supply through a conventional resistance outlet aforesaid, i. e., not greater than a 15 ampere demand. Preferably, the heating means in accordance with the present invention consumes or has a rating of not over about 10 amperes. Coupled with this heat storage means, means are provided in accordance with the present invention for abstracting heat from the heat storage means wherever the drying means is to be used and at a rate required by the drying means for heating the desired volume of air to the desired temperature, that is, at a rate much greater than at which heat is normally supplied to the heat storage means as aforesaid. In conjunction with the above there will, of course, be provided a more or less conventional blower driven by a more or less conventional driving means, such as an electric motor. There may also be provided in conjunction with the above, a means by which the air and the article to be dried, or both, are sterilized, for example, by rays from a sterilizing tube which are now conventional in the art. Such a tube not only generates rays which are themselves sterilizing in character, but also generates ozone, which may be used for deodorizing or otherwise sterilizing the vicinity. Provision is preferably made for operating this sterilizing tube either automatically, wherever the drying means is operated, or manually, by a manually controlled switch.

The drying apparatus of the present invention as has been outlined above, may be operated manually by a manually controlled switch, or automatically in response to the presence of an object to be dried in a drying zone, for example, by the interruption of a beam of light passing through this zone and the use of a photocell with a suitable control circuit.

Other and detailed features and embodiments of the present invention will become apparent from the following description thereof and will be pointed out in the appended claims, all when considered with the accompanying drawings, in which:

Figure 1:
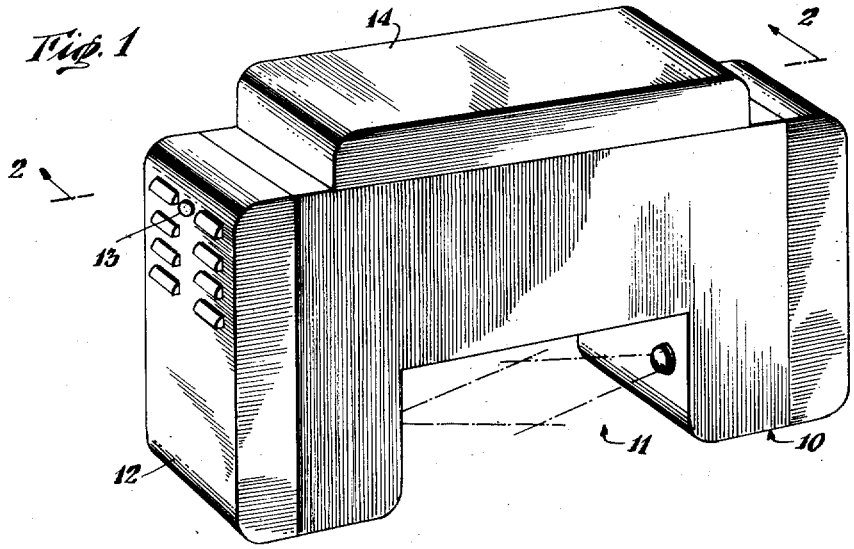
Figure 1 is a view in perspective of an apparatus, embodying the present invention.
Figure 3:
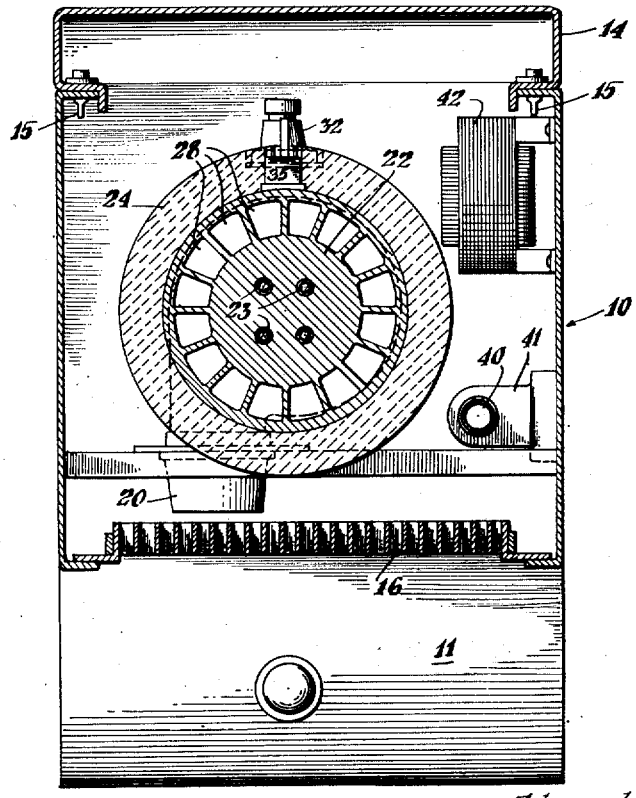
Fig. 3 is a view in transverse vertical section taken substantially on the line 3—3 of Fig. 2.
Figure 2:
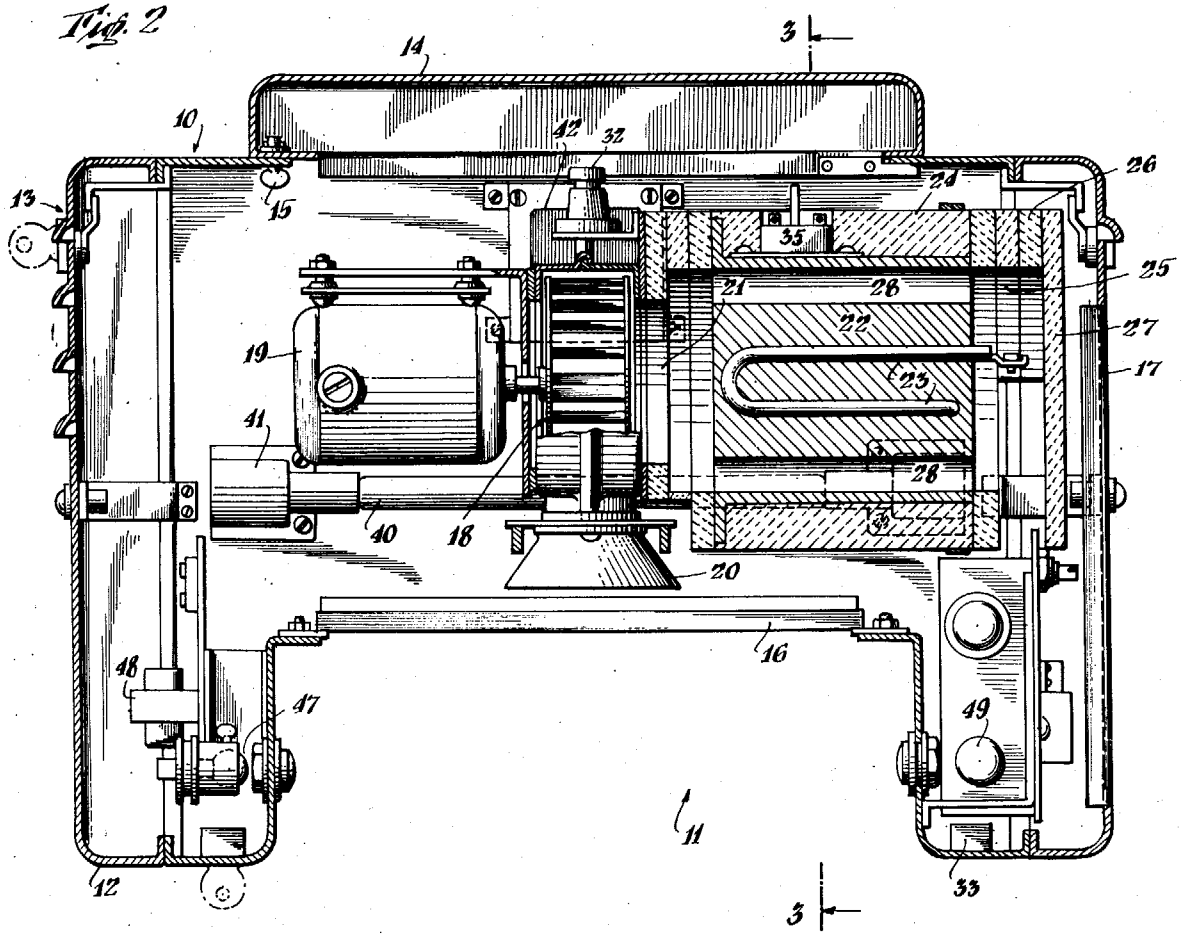
Fig. 2 is a view substantially in transverse vertical section taken on the line 2—2 of Fig. 1 and showing the interior construction.

While apparatus embodying the present invention may be constructed in a large number of different forms, there is chosen for purposes of illustration in the accompanying drawings a hand drying apparatus, which has been tested on a commercial scale and found to be desirable in use. This apparatus is shown in its exterior contour in Fig. 1, and comprises a casing generally indicated at 10, preferably of sheet metal or other suitable construction, and which may be mounted on any desired support, such as a wall of a room, by suitable means (not shown). The casing 10 has a generally inverted U-shaped contour, providing a recess 11 open to its underside, which may be considered a drying zone, and into which one or more objects to be dried may be introduced. The particular construction of the casing 10 is not a critical part of the present invention, but is shown in Figs. 1, 2 and 3. This casing may be provided with several demountable and removable portions, which when open permit access into the interior for replacement or repair of the apparatus enclosed within the casing. For example, one end portion shown at 12 may be removed from the main body portion of the casing by releasing a locking apparatus shown generally at 13, Fig. 2 A top portion 14 may be similarly removed by releasing a locking means 15, access to which may be had once the end portion 12 is removed. There is provided above the space or zone 11 an open grill work 16, through which heated air is passed or blown onto an object to be dried which is located within the drying zone 11. Air may be admitted to the interior of the casing 10 in any suitable way, for example, through apertures formed in one or both ends of the casing 10, or through suitable apertures formed in a manner not illustrated in the top portion 14 thereof. It is preferred, however, that the right hand end of the apparatus as seen in Fig. 2 be provided with apertures 17 as shown in that figure in the form of one or more louvered openings.

Suitably mounted within the casing 10 and preferably centrally thereof is a blower 18, which may be of any desired or conventional type and which may be operated by any suitable source of power, such as an electric motor 19. The blower 18 is arranged to supply air through an outlet opening or nozzle 20, Figs. 2 and 3, to a point centrally above a part of the grill 16, so that the air thus blown downwardly by the blower 18 will impinge upon an object to be dried in the recess or drying zone 11. The blower 18 has an inlet centrally thereof and usually axial of the rotor of the blower, this inlet opening being indicated at 21 in Fig. 2.

In accordance with the present invention, there is provided a heat storage means, which may be continuously heated at a relatively slow rate and which is arranged to supply its heat at a relatively rapid rate to the air being moved by the blower 18. This heat storage means comprises a body 22 of material having a substantial and preferably relatively high heat capacity or specific heat. In this instance, the heat storage means preferably comprises a cast body of aluminum or an aluminum alloy. The heat storage means is of a substantial size, so as to have a large heat capacity, great enough to supply the heat required for the air for the drying of a plurality of objects in rapid succession, so as to cope with such peak drying loads as may be met with in the expected normal use of the apparatus. Associated with this heat storage means is a heating element shown at 23 and which may take any conventional form, preferably of a resistance type and preferably shielded, so that the heating element as a whole may be totally embedded in the body 22. As shown, the heating element 23 is doubled upon itself several times, so that a heating element several times as long as the body 22 may be used. In this case, the element 23 is bent three times, so that there will be substantially four times the length of heating element in respect to the length of the body 22. This particular ratio, however, is not critical.

From a broad point of view, the electric heating element 23 used should be in good heat transferring relation to the body of material 22. The heating element 23 in accordance with the present invention has a heat capacity, for example, of 800 watts, which is substantially less in its demand for electric power than is safely available in the conventional electric outlets usually found in residences and in business buildings (15 amperes). As such, the heating element 23 may be operated continuously and also may be operated without at any time over-taxing the wiring or circuit in which it may be connected.

In a preferred form of the invention as shown in the accompanying drawings, the heating element 23 may be cast within the body of the material 22 by acting as a core when the material 22 is cast around it. In this way, the heating element is totally embedded within the heat storage means, so that all the heat generated therein will be used in that all of it will be supplied to the body of material 22.

In order to minimize stray heat loss, the body of material 22 is preferably suitably surrounded by any desired heat insulating means shown generally at 24. Inasmuch as heat insulation has now become a highly developed art, it is deemed unnecessary to give further details thereof except to state that some and preferably a considerable amount of heat insulation is preferably used in the practice of the present invention. This minimizes the operating cost of the apparatus by minimizing heat losses therefrom which serve no useful purpose.

At the right end, as seen in Fig. 2, of the body of material 22, there is provided an air inlet chamber 25 formed by top and side portions 26 of suitable heat insulating material and an end member 27 preferably also of such material. [Access for air to the chamber 25 is had through the lower end thereof, which is open to the interior of the casing 10. The body of material 22 is further provided with an annular series of air passages 28, which are respectively parallel to] *As particularly illustrated in Fig. 2, the chamber 25 is laterally bounded by three members collectively forming the portions 26. The left hand one of these three members, as seen in Fig. 2, is a complete annulus. The middle and right hand of these three members are each formed as the upper half only of an annulus. The end member 27 may be of any suitable shape, but it is preferably circular in shape in view of the circular shape of the body 22 as seen in Fig. 3. As a result, the entrance or inlet from the interior of the casing into the chamber 25 and thence into passages 28, which are formed in the body 22, is always at a level no higher than the passages 28. Thus air may flow from the interior of the casing into the chamber 25 at both the bottom and the sides*

*thereof, and thence into the passages 28. Because of the construction illustrated, air from the interior of the casing 10 can approach the chamber 25 from above, by going around the semi-annular members 26, also by moving substantially horizontally and directly into the chamber 25, as well as from below the chamber 25. In view of the fact that the entrance for air into the chamber 25 and thence into the passages 28 is no higher in a vertical direction than the passages 28 (collectively considered), as seen in Fig. 2, and as the outlet 20 is below the passages 28, there is substantially no tendency for heat loss due to a convection flow of air through the passages 28 when the motor 19 and the blower 18 are not operating. This is an important feature of the invention. The passages 28 are respectively parallel to* the axis of the substantially cylindrical body 22 of the heat storage means. The passages 28 communicate with the chamber 25, at their inlet ends at the right as is seen in Fig. 2, and with the inlet 21 of the blower at their left ends as seen in Fig. 2. Thus, there is provided a means for conducting air from the atmosphere, which communicates through the apertures 17 with the inside of the casing 10, and thence through the chamber 25, past the body of material 22 in which the heat is stored and in good heat transferring relation therewith by passing through the several passages 28, and thence to the intake 21 of the blower 18.

The apparatus thus far described comprises all the essential elements of apparatus required for its complete operation, there being, of course, a suitable electric circuit by which the heating element 23 may be energized, preferably on a substantially continuous basis, and the motor 19 driving a blower 18 being energized whenever it is desired to dry an object. Many types of electrical circuits are usable for this general purpose, a preferred circuit being that shown in Fig. 4 and including various automatic control devices and various safety devices and also including a sterilizing tube, which may be desired for use in a particular installation.

Before describing this particular circuit, however, it is to be understood that the present invention provides a device which may, if desired, be operated manually, so that the motor 19 may be connected in a suitable circuit with a manually operated switch in a manner which will now be apparent to those skilled in the art for operating the motor 19 whenever and as long as a user may desire. Such manual switch may be hand or foot operated, both systems being conventional in the art for controlling prior art types of drying apparatus as the present time.

Figure 4:
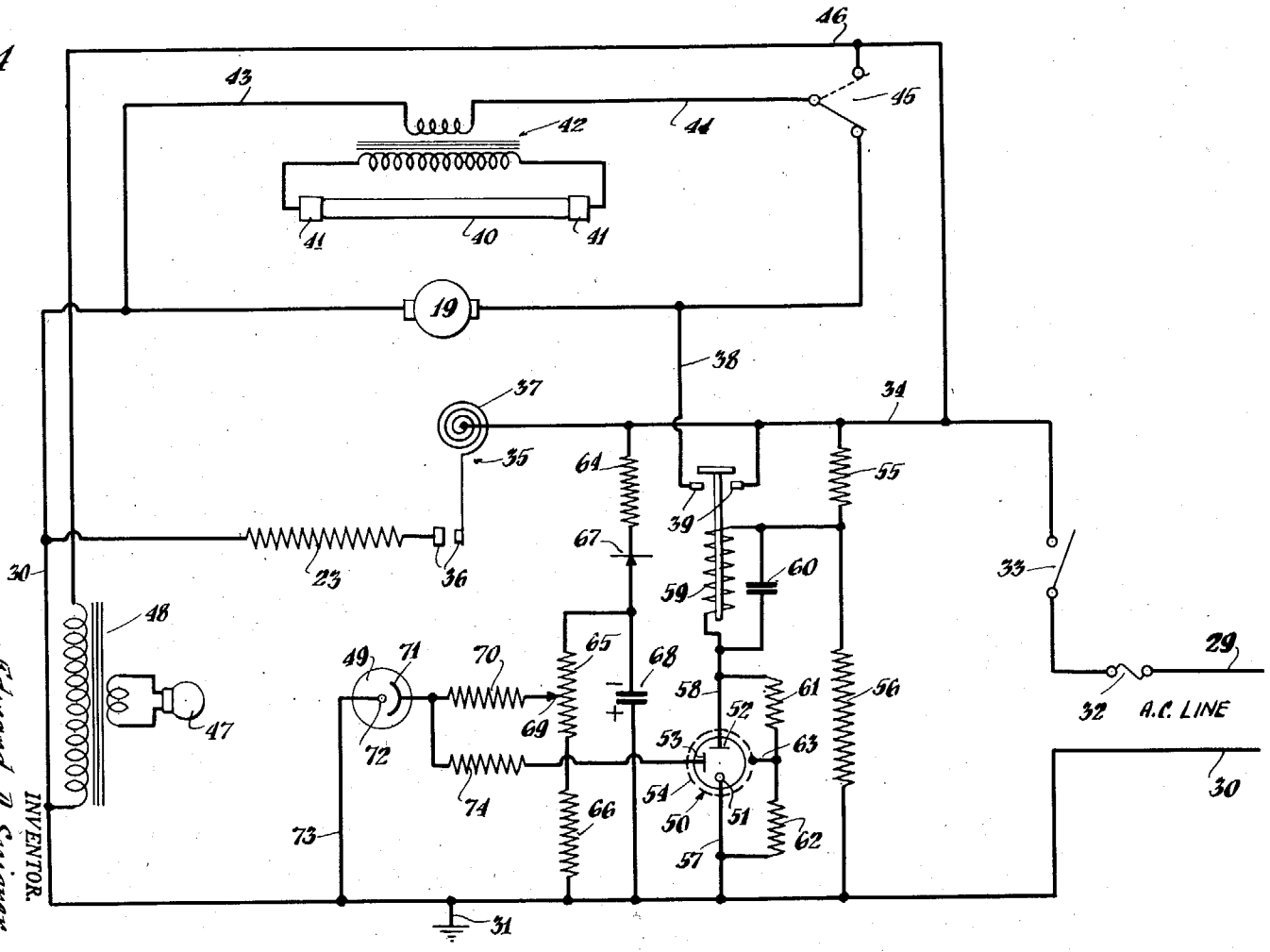
Fig. 4 is a wiring diagram, illustrating one type of circuit which may be used for controlling the apparatus shown in the preceding figures.

As shown in Fig. 4, the apparatus of the present invention may be energized from any A. C. supply line, indicated by the leads 29 and 30, the latter preferably being grounded as indicated at 31. There is preferably included in the supply line a fuse device generally indicated at 32, which is adapted not only to open the circuit to the entire apparatus of the present invention whenever there is an electrical overload thereon as in the case of conventional fuses, but also is adapted to respond to a too high temperature. Thus by locating the device 32 as shown in Fig. 2 adjacent to the heat storage body 22, whenever the temperature of that body and hence temperatures within the casing 10, tend to exceed some predetermined safe value, a fusible element within the device 32 is adapted to melt to open the circuit, preventing further or substantial damage to any parts of the apparatus herein described.

There is also included in the line 29 a manually operated master switch 33, which may be located as shown at the lower right hand portion of Fig. 2, and operated by the proprietor of the premises in which the apparatus of the present invention is located. For example, this master switch may be made to operate only by a key, so that the apparatus as a whole may be deactivated under the control of the proprietor, who will be provided with such a key; and operation by unauthorized persons will be prevented.

The heating element 23 may be connected from the grounded line 30 as shown in Fig. 4, through to a line 34, which is connected to the line 29 through the master switch 33 as shown. There may also be provided in series in the heating circuit a thermostatically operated switch 35, this switch including contacts 36 and a thermostatic element 37 positioned to be subject to the temperature of the heat storage body 22. In this way, the heating element 23 will be called upon to operate only when the heat storage means is at a temperature below some predetermined value to which the thermostatic switch 35 is set; and electric current will be saved once the heat storage means is brought up to the desired maximum temperature. Thus, the heating element 23 is, in a preferred form of the invention, adapted to operate continuously only when the temperature of the heat storage means is below some predetermined value.

As shown, the motor 19 is connected to the grounded lead 30 and is also connected through a line 38 and a switch 39 to the line 34, which is normally alive as shown whenever the master switch 33 is closed. It is contemplated that a manually operated switch may be used in lieu of the switch 39, although the circuit shown in Fig. 4 shows one form of automatic switch actuating means as hereinafter described.

There is preferably provided in conjunction with the apparatus of the present invention, but not as a necessary element thereof, a sterilizing tube 40, which may be of a conventional commercial type, such as one manufactured and sold by the Westinghouse Company. This tube is preferably mounted as shown in Figs. 2 and 3 in suitable sockets 41 adapted therefor and is energized by being connected across the secondary of a transformer 42, the primary of which is connected by a lead 43 to the grounded line 30 and by a lead 44 through a single pole, double throw switch 45, alternatively to the lead 38 or to a lead 46 which is connected to the lead 34. When the switch 45 is in the position shown in full lines in the drawings, Fig. 4, the tube 40 will be operated intermittently and concomitantly with the motor 19. If, however, the switch 45 were moved to its opposite position as shown in dotted lines in Fig. 4, the tube 40 would be continuously energized as long as the master switch 33 is closed. This affords an opportunity for a user to energize the tube 40 for the generation of ozone to deodorize the vicinity of the drying apparatus.

As above set forth, the apparatus of the present invention may be operated manually by a suitable manually operated switch. It may also be operated by various known automatic control means including those involving a change in capacitance of an electrical circuit due to the proximity of an object to be dried to some capacity-responsive element of the circuit. Further, it may be operated as shown in Fig. 4 by the use of a so-called "electric eye," that is, by providing a beam of light passing across the drying zone and normally impinging upon a photocell. In such an arrangement, whenever an object to be dried, such as the hands of a user, are introduced in the drying zone, the beam of light is interrupted and the electrical characteristics of the circuit including the photocell thereby varied, so as to initiate the operation of a suitable control circuit.

As shown in the accompanying drawings, there is provided a light source 47, which is energized from the secondary of a transformer 48, the primary of which is connected to the current source by being connected respectively to the grounded lead 30 and to the lead 46 as shown. There is also provided a photocell 49 so positioned as normally to receive light from the light source 47. A suitable circuit of any desired kind including that herein particularly described may be employed for automatically controlling the switch 39 from the pohtocell 49. For example, circuits as disclosed in either of my Patents Nos. 2,551,224 or 2,551,225, both granted on May 1, 1951, may be employed for this purpose.

There is shown in the accompanying drawings, however, a circuit embodying an electronic tube 50 of the cold cathode, gas-filled type having internally thereof a cathode 51, an anode 52, and a starting electrode 53, and also provided externally thereof with an additional electrode 54. Such a tube and a circuit for use therewith is described in greater detail in my Patent No. 2,551,225 aforesaid. The cathode-anode circuit of the tube 50 is connected across a part of the available A. C. potential. For this purpose between the leads 30 and 34 there is provided a circuit including a dropping resistor 55 and a potential determining resistor 56 in series therewith. The cathode 51 is connected to ground (the lead 30) by a lead 57; while the anode 52 is connected to a point between the resistors 55 and 56 by a lead 58 and a series-connected coil 59 of a plate relay which is arranged mechanically to operate the switch 39. A suitable holding condenser 60 is shunted across the coil 59 as shown, for the purpose described in greater detail in my Patent No. 2,551,225 aforesaid.

Between the leads 57 and 58 is a shunt circuit including series-connected resistors 61 and 62, the intermediate connection of which is connected by a lead 63 to the external electrode 54 of the tube 50. Thus, the external electrode will be energized by an A. C. potential in phase with the cathode-anode potential.

Also connected across the leads 34 and 30 is a circuit or current path including series-connected resistors 64, 65 and 66, the resistor 65 serving as a potentiometer resistor for a purpose hereinafter described, and a rectifier generally indicated at 67 being connected in series between the resistors 64 and 65. In shunt with the resistors 65 and 66 is a condenser 68, which may be charged with polarities as indicated on the drawings due to the presence of the rectifier 67. The adjustable potentiometer tap 69 of the potentiometer resistor 65 is connected through a dropping resistor 70 to the cathode 71 of the photocell 49, the anode 72 of which is connected to ground (lead 30) by a lead 73. The cathode 71 of the photocell 49 is also connected through a resistor 74 with the starting electrode 53 of the tube 50.

In operation, it will be seen that the condenser 68 will be charged with the polarity indicated on the drawing due to the presence of the rectifier 67, and further that the starting electrode 53 will be supplied with a potential negative in respect to the cathode 51, also due to the connections shown and described. This negative potential will be varied by the photocell 49, so that when the light from the source 47 is impinging normally upon the photocell, the potential effective on the starting electrode 53 will be insufficient to fire the tube 50, which will remain inactive as long as this situation exists. As a result, the plate relay coil 59 will be deenergized and the switch 39 open.

When, however, the passage of light from the source 47 to the photocell 49 is interrupted, the potential of the starting electrode 53 will be increased as explained in detail in my Patent No. 2,551,225 aforesaid, so as to cause the ionization of the gas in the tube 50 between the starting electrode 53 and the cathode 51. This in turn will fire the tube 50, permitting current flow through the cathode-anode circuit thereof and energizing the relay coil 59, so as to close the switch 39. This switch will be closed as long as light to the photocell 49 continues to be interrupted. As a result, the motor 19 will be operated during this period; and in the position of the switch 45 shown in full lines, the tube 40 will likewise be energized automatically during this period.

Once the light flow to the photocell 49 is again re-established by the removal from the drying zone 11 of an object to be dried, the potential on the starting electrode 53 will again decrease; the tube 50 will cease firing; the relay coil 59 will be deenergized; and the switch 39 will be opened by gravity or by any suitable means, such as a spring, conventional in relay apparatus of this kind, resulting in the cessation of the operation of the motor 19 and the tube 40.

The purpose of providing the adjustable potentiometer 65—69 is to provide an adjustment as to sensitivity, so as particularly to make the photocell sensitive to different amounts of light. This may be used to compensate for gradual reduction in the light emanating from any particular incandescent bulb used as the light source 47 and also to compensate for different light intensities coming from different bulbs, in the event that one should burn out and be replaced by another giving a somewhat different amount of light.

As an example of the present invention using the circuit shown in Fig. 4, the following values of the circuit elements have been found to be operative, these values not being the only operative values however and being illustrative but not limiting. The heating element 23 may be an 800 watt "Calrod" unit made by General Electrical Company. The switch 35 may be a standard commercial thermostatic switch. The tube 50 may be a tube as particularly disclosed in my Patent No. 2,551,225 aforesaid. The resistors 55 and 56 may have values of 820 ohms and 10,000 ohms respectively. The relay including coil 59 is a 2,500 ohm relay, and the condenser 60 may be a 1.0 mfd. capacitor. The resistors 61 and 62 have 20 megohms and 15 megohms resistance respectively. The resistors 64, 65 and 66 have resistances of 100,000 ohms, 5 megohms and 7.5 megohms respectively. The rectifier 67 is a low capacity selenium rectifier capable of handling up to 5 milli-amperes of current. The resistors 70 and 74 have resistances of 60 megohms and 100,000 ohms respectively. The photo tube 49 may be a 1P39 type. The light source 47 is about a 3 candle power incandescent bulb drawing about 1 ampere at 5 volts.

While there has been shown and described a preferred embodiment of the present invention, and the essential and non-essential features thereof have been set out in adequate detail to teach those skilled in the art the best manner of making and using the device, some alternative constructions have been described and others will suggest themselves from the foregoing description to those skilled in the art. I do not wish to be limited, therefore, except by the scope of the appended claims, which are to be construed validly as broadly as the state of the prior art permits.

What is claimed is:

1. Apparatus adapted for intermittent operation for drying the hands of a user, comprising a support, heat storage means comprising a body of material carried by said support and having a substantial heat storage capacity; means forming an air passage through said apparatus from a downwardly directed inlet from the atmosphere located at a level below that of said body of material, passage means past said body of material and in good heat transferring relation therewith to a downwardly directed outlet through which air may flow toward an area where the hands of a user may be located to be dried, said outlet also being located at a level below that of said body of material, said air passage forming means being closed to the atmosphere except for said inlet and said outlet so as to prevent convection heat losses from said body of material; an air blower located in said air passage forming means, an electric motor for actuating said blower; an electric heating element mounted in good heat transferring relation to said body of material and having a heating capacity substantially less than that which would be required for heating air to a selected drying temperature at the rate at which air is moved by said blower, an electric circuit adapted for substantially continuously supplying energy to said heating element for thereby supplying heat to said heat storage means at a relatively slow rate, and means for intermittently actuating said blower for intermittently drying the hands of a user by air heated by withdrawing heat from said heat storage means at a relatively rapid rate during the intermittent periods of operation only of said blower.

2. Apparatus in accordance with claim 1, comprising in addition, a light source and a photocell respectively positioned on opposite sides of said area where the hands of a user may be located to be dried, and circuit means controlled by said photocell for controlling said air blower to cause the operation thereof whenever the hands of a user are in position in said area to interrupt the path of light between said light source and said photocell.

3. Apparatus in accordance with claim 1, wherein said air blower is located in said passage means between said body of material and said downwardly directed outlet, so as to draw air past said body of material and to cause such air to flow through said outlet toward the hands of a user which are to be dried.

4. Apparatus in accordance with claim 1, wherein said electric heating element is bodily cast within said body of material, which is in turn of cast metal.

*5. Apparatus adapted for intermittent operation for drying the hands of a user, comprising a support, heat storage means comprising a body of material carried by said support and having a substantial heat storage capacity, passage means past said body of material and in good heat transferring relation therewith, an inlet from the atmosphere to said passage means located at a level at least as low as said passage means, an outlet from said passage means through which air may flow toward an area where the hands of a user may be located to be dried, an air blower located in the air passage forming means made up of said inlet, said passage means past said body of material and said outlet, an electric motor for operating said blower, said inlet and said outlet being so close in a vertical direction to the level of said passage means as substantially to prevent convection heat losses from said body of material when air is not being positively moved therethrough by said motor and said blower; an electric heating element in good heat transferring relation to said body of material and having a heating capacity substantially less than that which would be required for heating air to a selected drying temperature at the rate at which air is moved by said blower, an electric circuit adapted for substantially continuously supplying energy to said heating element for thereby supplying heat to said heat storage means at a relatively slow rate, and means for intermittently actuating said blower for intermittently drying the hands of a user by air heated by withdrawing heat from said heat storage means at a relatively rapid rate during the intermittent periods of operation only of said blower.*

*6. Apparatus for drying the hands of a user in accordance with claim 5, wherein said support comprises an outer casing containing said body of material, said blower and said motor; and wherein said inlet to said passage means communicates between said passage means and the interior of said casing and is disposed at least in part at the level of said passage means.*

EDWARD D. SPIERER.

References Cited in the file of this patent or the original patent

UNITED STATES PATENTS

| Number | Name | Date |
|---|---|---|
| 1,760,997 | Shelton | June 3, 1930 |
| 2,450,983 | Osterheld | Oct. 12, 1948 |
| 2,521,769 | Arcularius | Sept. 12, 1950 |

FOREIGN PATENTS

| Number | Country | Date |
|---|---|---|
| 364,664 | Great Britain | Jan. 4, 1932 |